April 19, 1927.

C. F. MÉNDEZ 1,625,271

SPRING WHEEL

Filed Dec. 11, 1924    2 Sheets-Sheet 1

Inventor:
C.F. MÉNDEZ,
By Ogle R. Singleton
Attorney.

April 19, 1927.  C. F. MÉNDEZ  1,625,271
SPRING WHEEL
Filed Dec. 11, 1924  2 Sheets-Sheet 2
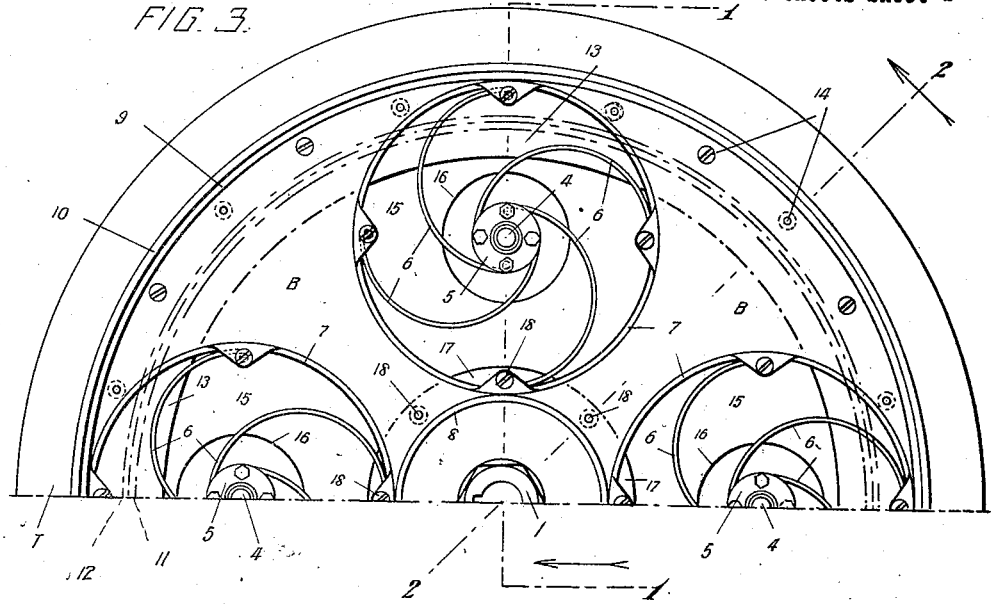
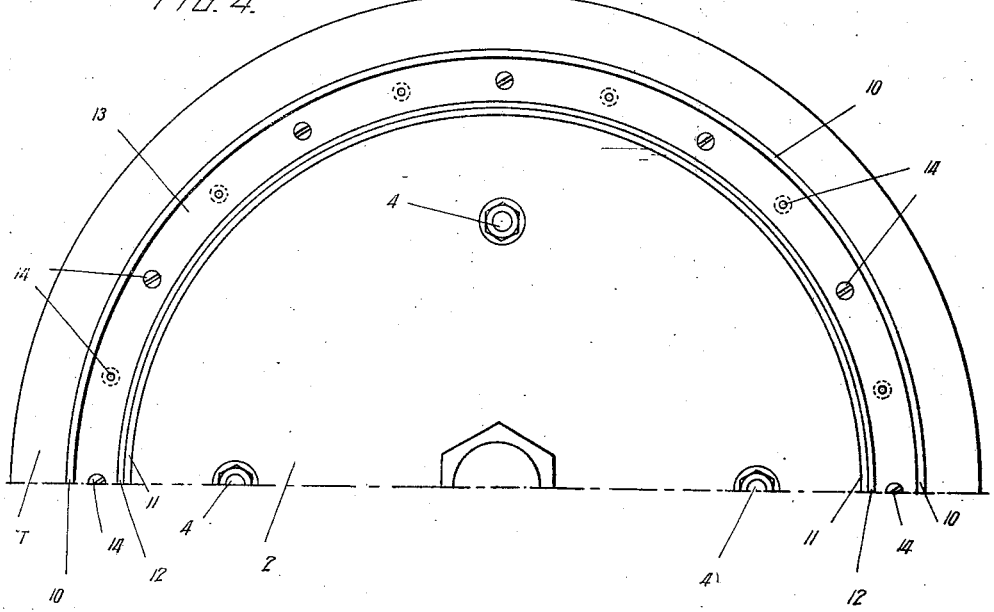
Inventor:
C. F. MÉNDEZ,
By
Attorney.

Patented Apr. 19, 1927.

1,625,271

UNITED STATES PATENT OFFICE.

CIRO FIDEL MÉNDEZ, OF MEXICO CITY, MEXICO, ASSIGNOR TO IRVING S. COOPER, OF LOS ANGELES, CALIFORNIA.

SPRING WHEEL.

Application filed December 11, 1924. Serial No. 755,223.

My invention consists in a new and useful improvement in spring wheels and is designed to provide a wheel embodying certain improvements upon the wheel described and claimed in my co-pending application for Letters Patent, filed March 26th 1924, Serial Number 701,990. A particularly useful improvement which is embodied in this wheel is the re-inforcing plates which are interposed between the rim of the wheel and the radial extensions from the spring mounted hub. The purpose of these plates is to bear the side thrusts and strains when the wheel is in use. Another important improvement is embodied in this wheel is the outwardly extending flanges on the radial extensions from the hub, and the outward extensions of the rim intended to co-act with the flanges in the event of any failure of the spring mountings to support the hub. Another important improvement is the cushioning elements provided upon the outwardly extending flanges of the radial extensions. These elements are so disposed on the flanges as to bear against the re-inforcing plates and effect a snubbing action against the resiliency of the spring members supporting the hub.

In the drawings filed herewith I have illustrated one specific embodiment of my invention but it is to be understood that I do not consider my invention limited to the specific embodiment hereinafter fully described but refer for its scope to the claims appended hereto.

In the drawings:

Fig. 3 is a side elevation of one half of the wheel, with its cover portions removed to disclose the interior arrangement.

Fig. 4 is a side elevation of one half of the wheel.

Figure 1:
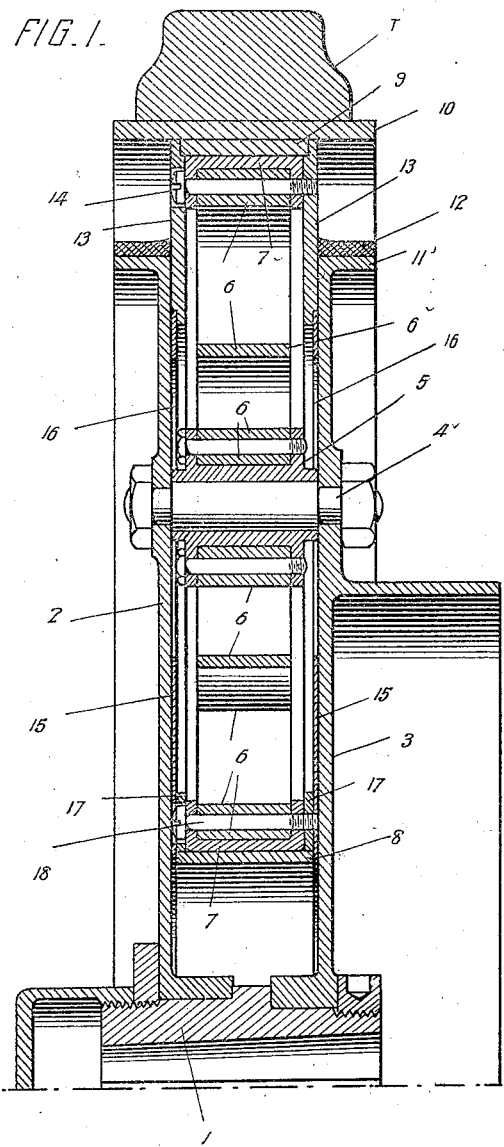
Fig. 1 is a section on the line 1—1 of Fig. 3.

My improved wheel is mounted upon the axle by a hub 1 to which radial extensions 2 and 3 are suitably fixed. These radial extensions 2 and 3 are carried by connecting bolts 4 upon which are mounted spools 5 from which radiate semi-circular springs 6 supported by the casings 7. Centrally disposed relative to the casings 7 is the casing 8 surrounding the hub 1. The rim 9 carries the casings 7 and is peripherally disposed relative thereto. The spaces within the rim 9 between the casings 7 may be provided with filler blocks B to add stability to the wheel. An outer rim 10 carrying the inner rim 9 is provided, to which is attached any suitable form of tire T. This rim 10 is of a width considerably larger than the rim 9, the inner face of this rim 10 overlying flanges 11 on the peripheries of the radial extensions 2 and 3. These flanges 11 are provided with facings 12 of leather or other cushioning material, attached to the flanges 11 by any suitable means.

From the foregoing description it is apparent that should the resilient mountings within the casings 7 fail, the flanges 11 of the radial extensions 2 and 3 would contact the rim 10 and thus provide an emergency adjustment of the wheel, the facings 12 acting as buffers, between the flanges 11 and the rim 10.

Figure 2:
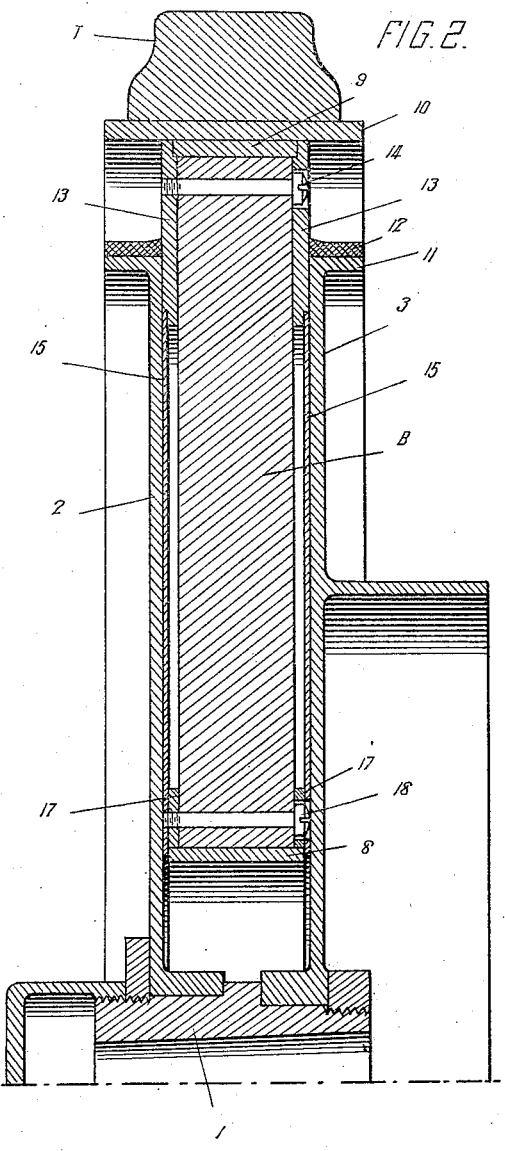
Fig. 2 is a section on the line 2—2 of Fig. 3.

I provide between the casings 7 and the outer edges of the radial extensions 2 and 3 re-inforcing side plates in the form of rings 13 which extend inwardly from the rim 10 past the outer edges of the extensions 2 and 3. As the filler blocks B are of the same width as the casings 7, it will be obvious that these rings 13 abut the blocks B, as indicated in Fig. 2. These rings 13 are held in place by bolts 14, certain of which serve to fasten the springs 6 to the casings 7, as indicated in Fig. 1, and the remainder passing through the blocks B as indicated in Fig. 2. I arrange these bolts 14 in two series, the bolts 14 of one series being inserted through one of the rings 13 and screwed into the opposite ring 13, the alternate bolts being arranged vice-versa.

It is to be noted that these re-inforcing plate rings 13 are so disposed relative to the outer structure of the wheel, that is, the casings 7, blocks B and rims 9 and 10, and the inner structure of the wheel, that is, the hub 1 and its radial extensions 2 and 3, as to receive the strain of side thrusts, thus affording the requisite strength to the wheel.

It is also to be noted that in applying the facings 12 to the flanges 11, the inner edges of these facings 12 are disposed in compressed contact with the outer surfaces of the rings 13. The effect of this disposition of the facings 12 is to provide what amounts to snubbers against the operation of the springs 6.

I also provide cover discs 15 extending from the rings 13 to the inner casing 8 and disposed between the casings 7 and the radial extensions 2 and 3. These discs 15 are provided with openings 16 to permit the passage therethrough of the bolts 4. I provide filler rings 17 between these discs 15 and the casings 7 adjacent the inner casing 8. These discs 15 and rings 17 are held in place by bolts 18 similar to bolts 14.

Having described my invention, what I claim is:

1. In a spring wheel, the combination of a rim; springs carried by said rim; discs carried by said springs; a hub carried by said discs; re-inforcing plates attached to said rim and bearings against said discs; and cushioning material applied to the peripheries of said discs and in compressed contact with the faces of said plates, and adapted to act as snubbers against the action of said springs.

2. In a spring wheel, the combination of a rim; springs carried by said rim; discs carried by said springs; a hub carried by said discs; re-inforcing plates attached to said rim and bearing against said discs; outwardly extending flanges on the peripheries of said discs, said rim overlying said flanges; and cushioning material applied upon said flanges in compressed contact with the faces of said plates, adapted to act as snubbers against the action of said springs.

In testimony whereof I affix my signature.

CIRO F. MÉNDEZ.